(12) United States Patent
Shimizu

(10) Patent No.: US 10,822,009 B2
(45) Date of Patent: Nov. 3, 2020

(54) KNOCK-DOWN HAMPER

(71) Applicant: Seville Classics Inc., Torrance, CA (US)

(72) Inventor: Tzuyi Shimizu, Playa del Rey, CA (US)

(73) Assignee: Seville Classics Inc., Torrance, CA (US)

( * ) Notice: Subject to any disclaimer, the term of this patent is extended or adjusted under 35 U.S.C. 154(b) by 0 days.

(21) Appl. No.: 16/368,479

(22) Filed: Mar. 28, 2019

(65) Prior Publication Data

US 2020/0308758 A1 Oct. 1, 2020

(51) Int. Cl.
| | | |
|---|---|---|
| B62B 3/02 | (2006.01) | |
| D06F 95/00 | (2006.01) | |
| B62B 5/00 | (2006.01) | |
| B62B 3/00 | (2006.01) | |

(52) U.S. Cl.
CPC ............... *B62B 3/02* (2013.01); *B62B 3/002* (2013.01); *B62B 5/00* (2013.01); *D06F 95/002* (2013.01)

(58) Field of Classification Search
CPC ........... B62B 3/002; B62B 3/02; B62B 3/027; B62B 5/00; D06F 95/002; D06F 95/004
USPC ...................................................... 280/47.34
See application file for complete search history.

(56) References Cited

U.S. PATENT DOCUMENTS

| | | | | |
|---|---|---|---|---|
| 4,354,543 A * | 10/1982 | Bogner | .................. | D06F 95/004 220/283 |
| 4,989,749 A | 2/1991 | Choi | | |
| 5,232,274 A * | 8/1993 | Johan | ..................... | B65F 1/1415 248/101 |
| 5,881,975 A * | 3/1999 | Bianco | ................. | B65B 67/1227 248/95 |
| 6,354,619 B1 * | 3/2002 | Kim | ......................... | B62B 3/106 280/649 |
| 6,859,957 B1 * | 3/2005 | Chen | ......................... | A47D 7/00 5/93.1 |
| 8,100,280 B1 | 1/2012 | Hernandez | | |
| 10,011,944 B2 | 7/2018 | Poldervaart | | |
| D855,916 S | 8/2019 | Li | | |
| D856,617 S | 8/2019 | Li | | |
| 10,421,573 B2 | 9/2019 | Ribbe et al. | | |
| 2006/0032992 A1 | 2/2006 | Rosheuvel | | |
| 2010/0283227 A1 | 11/2010 | Perelli et al. | | |
| 2011/0174812 A1 | 7/2011 | Ainsworth | | |
| 2013/0133136 A1 * | 5/2013 | Cheng | .................. | A47D 13/066 5/282.1 |
| 2014/0353322 A1 | 12/2014 | Kellogg | | |

* cited by examiner

*Primary Examiner* — John D Walters
(74) *Attorney, Agent, or Firm* — Raymond Sun

(57) ABSTRACT

A hamper has a base having a base frame with a base shelf provided inside the base frame, and a plurality of caster assemblies secured to the base frame. A supporting frame assembly has two U-shaped frames, with each U-shaped frame having a horizontal base bar and two vertical bars extending from opposite ends of the base bar, with the two U-shaped frames coupled to each other at the center of each base bar, and with the base bars secured to the base. A fabric body has a plurality of side walls, and four vertical corner sleeve pockets, with each vertical corner sleeve pocket defining a channel that receives a separate vertical bar. A top frame secured to the upper ends of the vertical bars.

9 Claims, 6 Drawing Sheets

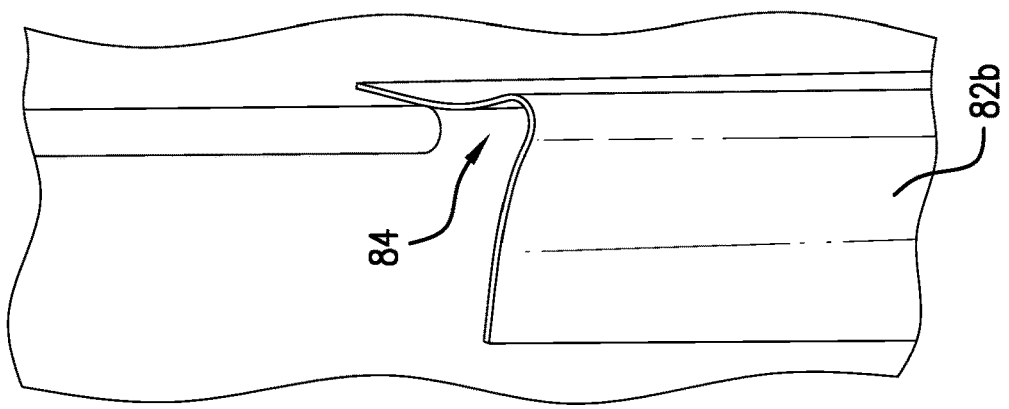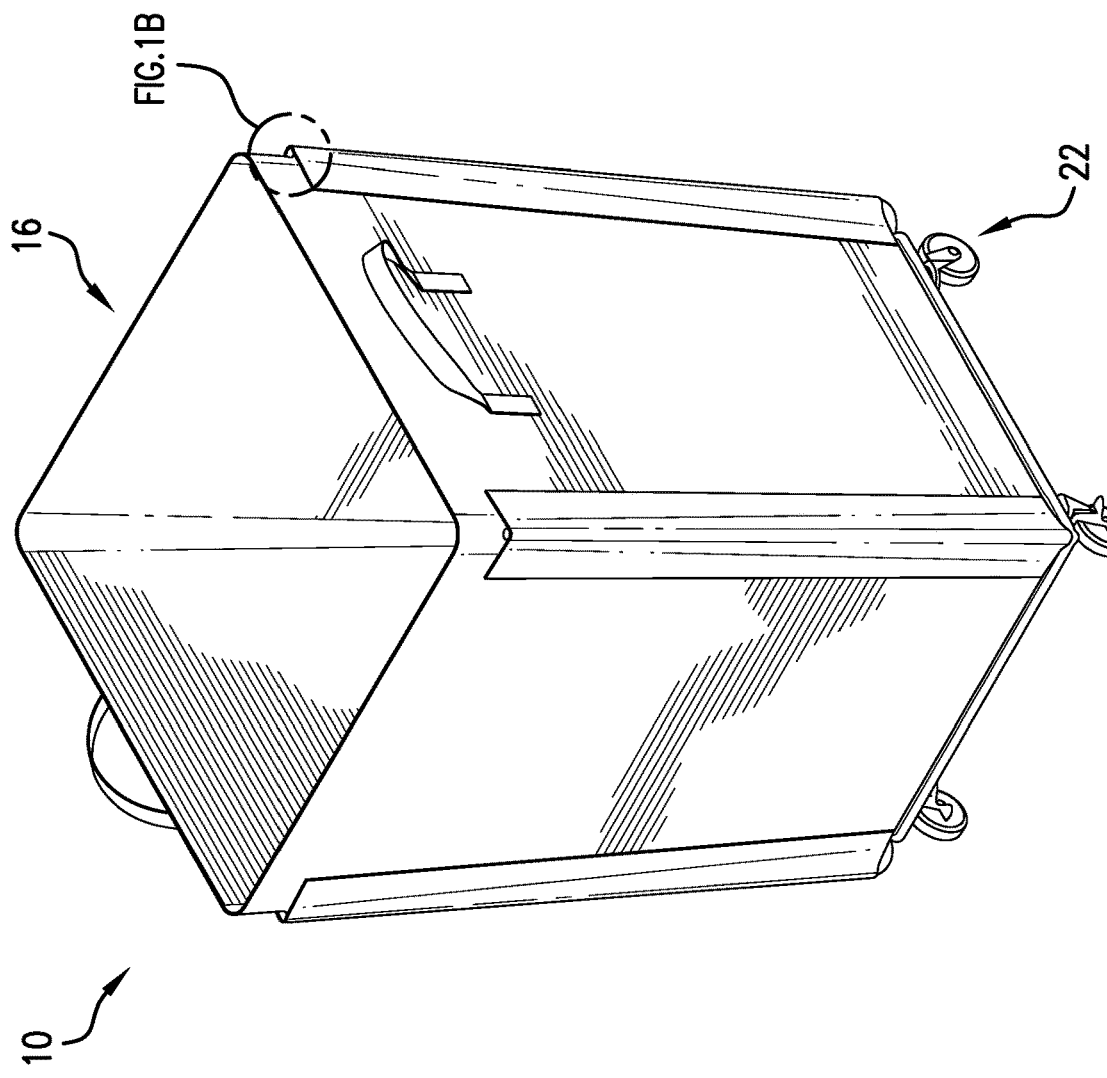

US 10,822,009 B2

KNOCK-DOWN HAMPER

BACKGROUND OF THE INVENTION

1. Field of the Invention

The present invention relates to a hamper that is can be quickly and conveniently assembled for use.

2. Description of the Prior Art

Portable hampers for use in holding and carrying laundry has become an important part of modern life, where it is necessary to carry a load of dirty laundry from a bathroom to a washing machine. This need becomes more acute for people living in accommodations, such as apartments and dormitories, where they do not have immediate access to a washing machine and need to haul the load of laundry for a certain distance to the washing machine.

Collapsible hampers have been used by many college students and apartment dwellers because they are easy to use, and can be easily and quickly folded into a smaller size. An example of a collapsible hamper is shown and described in U.S. Pat. No. 7,066,647. Unfortunately, these collapsible hampers are not capable of handling the weight of heavy laundry, so they are not durable and need to be replaced frequently. In addition, where the laundry needs to be carried for long distances (such as down long hallways in a dormitory), these collapsible hampers are not feasible as they do not have rollers and the user must physically carry the hamper.

As a result, larger hampers that have rollers or wheels are more feasible alternatives for transporting loads of dirty laundry. The biggest problem with larger hampers that have rollers is that they occupy a lot of space when assembled. With shelf-space at retail stores and outlets being at a premium, it is simply not feasible for separate and individual assembled rolling hampers to be placed in stores for sale.

Thus, there still remains a need for a rolling hamper that occupies minimal shelf-space or store-space, which can be conveniently and quickly assembled for use, and which provides a stable and solid construction for extended durability.

SUMMARY OF THE DISCLOSURE

The present invention provides a knock-down hamper that can be packaged in a small and slim packaging or box, which can be conveniently and quickly assembled for use, and which provides a stable and solid construction for extended durability.

In order to accomplish the objects of the present invention, the present invention provides a hamper and a method of assembling the hamper. The hamper has a base having a base frame with a base shelf provided inside the base frame, and a plurality of caster assemblies secured to the base frame. A supporting frame assembly has two U-shaped frames, with each U-shaped frame having a horizontal base bar and two vertical bars extending from opposite ends of the base bar, with the two U-shaped frames coupled to each other at the center of each base bar, and with the base bars secured to the base. A fabric body has a plurality of side walls, and four vertical corner sleeve pockets, with each vertical corner sleeve pocket defining a channel that receives a separate vertical bar. A top frame secured to the upper ends of the vertical bars.

BRIEF DESCRIPTION OF THE DRAWINGS

FIG. 1A is a perspective view of a hamper according to the present invention shown in an assembled configuration.

FIG. 1B is an enlarged view of the area marked X in FIG. 1A.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 2:
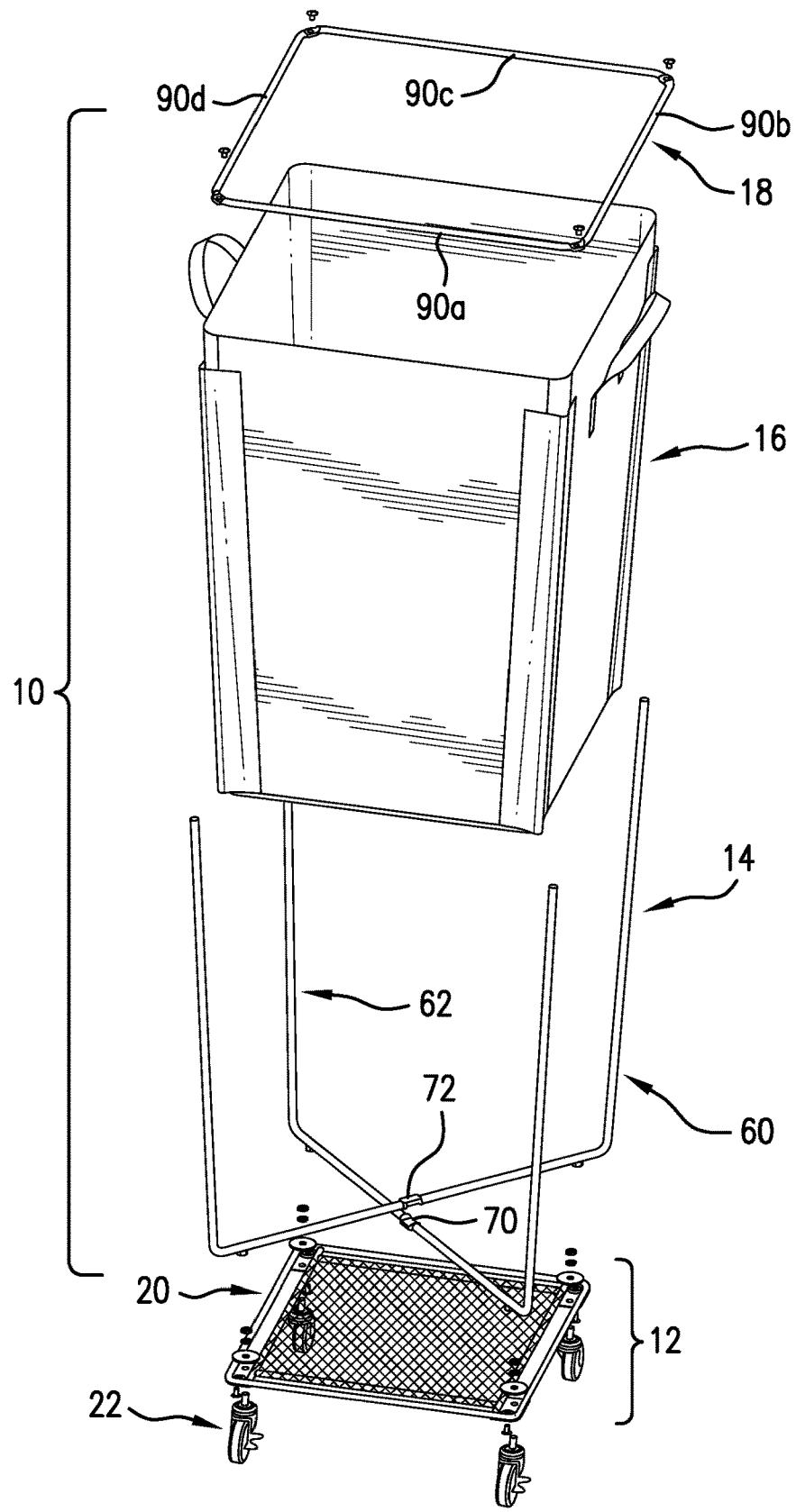
FIG. 2 is an exploded perspective view of the hamper of FIG. 1.

FIGS. 1-6B illustrate a knock-down hamper 10 according to the present invention. Referring to FIGS. 1A and 2, the hamper 10 has a base 12, a supporting frame assembly 14, a fabric body 16 and a top frame 18.

Figure 3A:
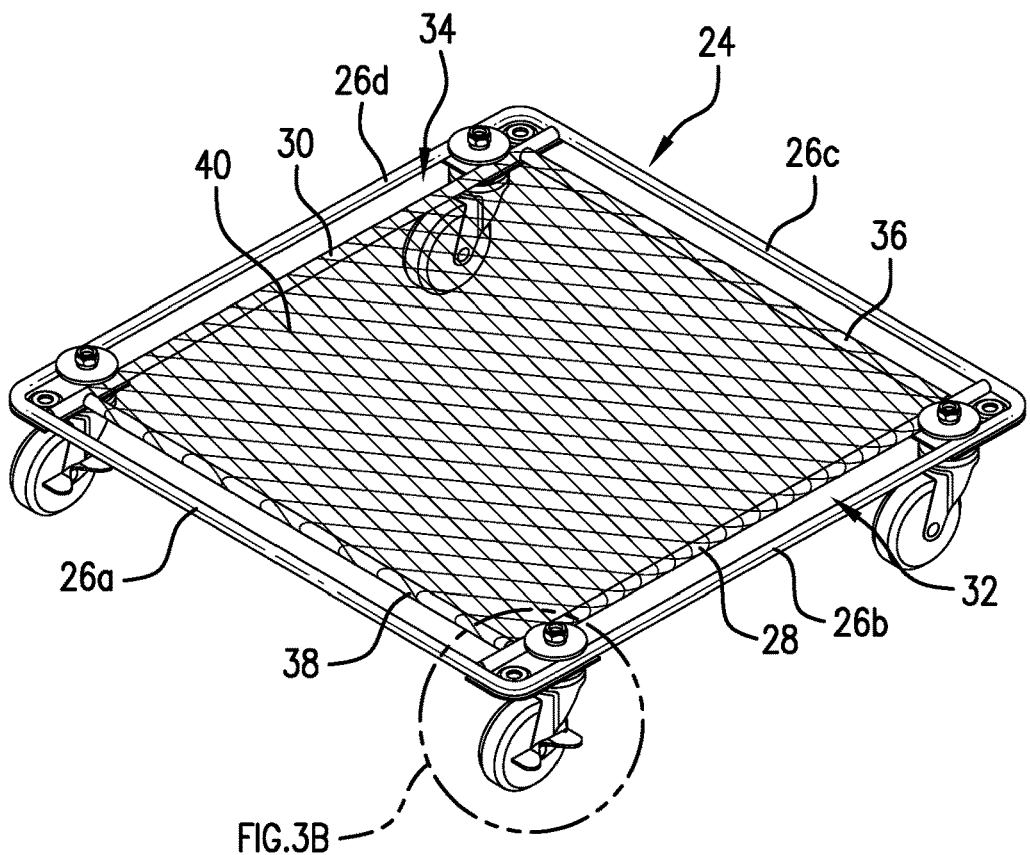
FIG. 3A is a perspective view of the base of the hamper of FIG. 1.
Figure 3B:
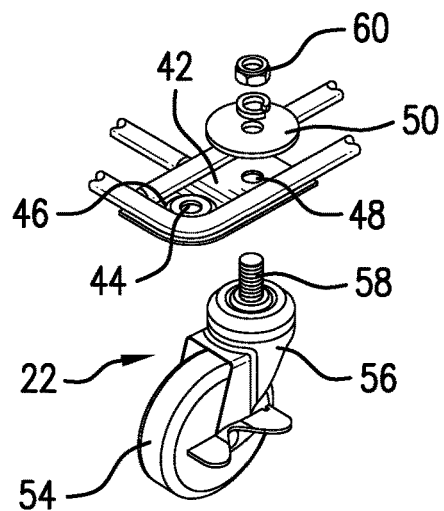
FIG. 3B is an enlarged view of the area marked Y in FIG. 3A showing how the rollers are attached to the base frame.

The base 12 includes a base frame 20 and a plurality of roller caster assemblies 22. Referring to FIGS. 3A and 3B, the base frame 20 has a peripheral frame 24 which can have four sides 26a, 26b, 26c and 26d. Two long bars 28 and 30 have their opposite ends connected to opposing sides 26a and 26c, and are parallel with the other two sides 26b and 26d. A lateral space 32 is defined between the bar 28 and the side 26b, and another lateral space 34 is defined between the other bar 30 and the side 26d. Two short bars 36 and 38 have their opposing ends connected to the bars 28 and 30. A wire mesh 40 or other arrangement of metal wires spans the space defined by the four bars 28, 30, 36 and 38 to form a wire base shelf.

A corner plate 42 is provided at each corner of the frame 24 inside one of the lateral spaces 32 or 34. Each corner plate 42 has a first opening 44 that is positioned at the specific location of the corner of the frame 24. A raised mounting member 46 is provided at the first opening 44. A second opening 48 is spaced apart from the first opening 44. A washer 50 is positioned above the second opening 48.

A conventional roller caster assembly 22 is secured to each second opening 48. The caster assembly 22 has a roller 54 provided in a roller housing 56, and a threaded screw 58 extends upwardly from the roller housing 56. The roller housing 56 is positioned below the corner plate 42, and the threaded screw 58 is adapted to extend through the second opening 48, and another opening in the washer 50. A nut 60 is threadably secured to the screw 58 above the washer 50 to secure the caster assembly 52 to the location of the second opening 48. Once the caster assemblies 22 have been secured to the base frame 20, the assembly procedure is ready for the next step of attaching the supporting frame assembly 14.

Figure 4:
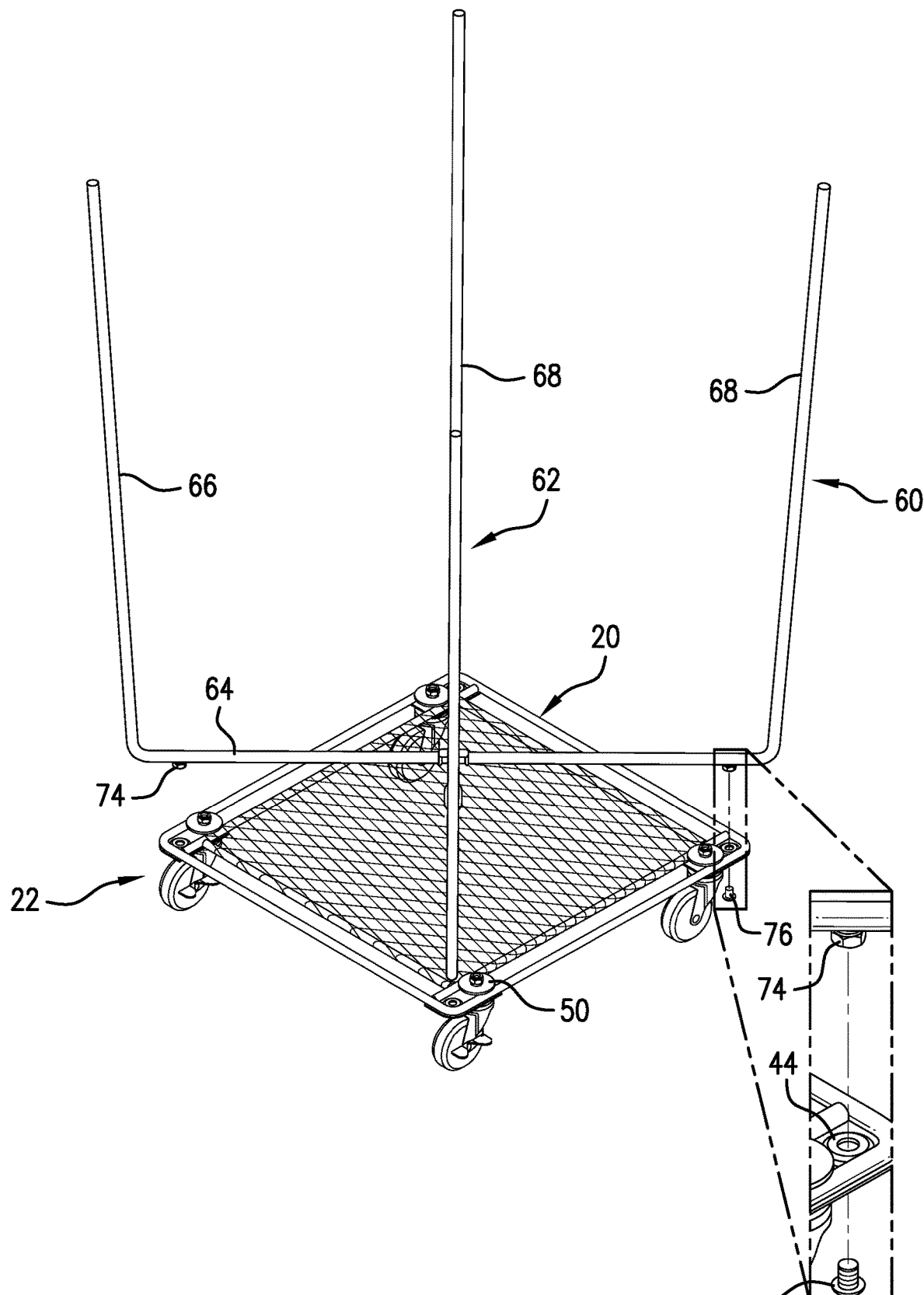
FIG. 4 illustrates how the supporting frame assembly is connected to the base of the hamper of FIG. 1.

Referring now to FIGS. 2 and 4, the supporting frame assembly 14 has two U-shaped frames 60 and 62. Each U-shaped frame 60 and 62 has a horizontal base bar 64 and two vertical bars 66 and 68 extending from opposite ends of the base bar 64. The two U-shaped frames 60 and 62 are provided separately and then placed one on top of the other. Specifically, the base bar 64 of the U-shaped frame 62 has a groove 70 at its center and the base bar 64 of the U-shaped frame 60 has an inverted groove 72 at its center so that the two grooves 70 and 72 are adapted to be fitted with each other as shown in FIG. 2. Two nuts 74 are provided at the bottom of each base bar 64 at positions that are aligned with the first opening 44, so that the two U-shaped frames 60 and 62 can be positioned in a crossing orientation with each nut 74 above a corresponding first opening 44. A screw or bolt 76 can then be screwed from below the base frame 20 through the first opening 44 and threadably engage the nut 74, so as to secure the two U-shaped frames 60 and 62 on top of the base frame 20. In this embodiment, each base bar 64 is secured to two diagonally opposing corners of the frame 20.

Figure 5:
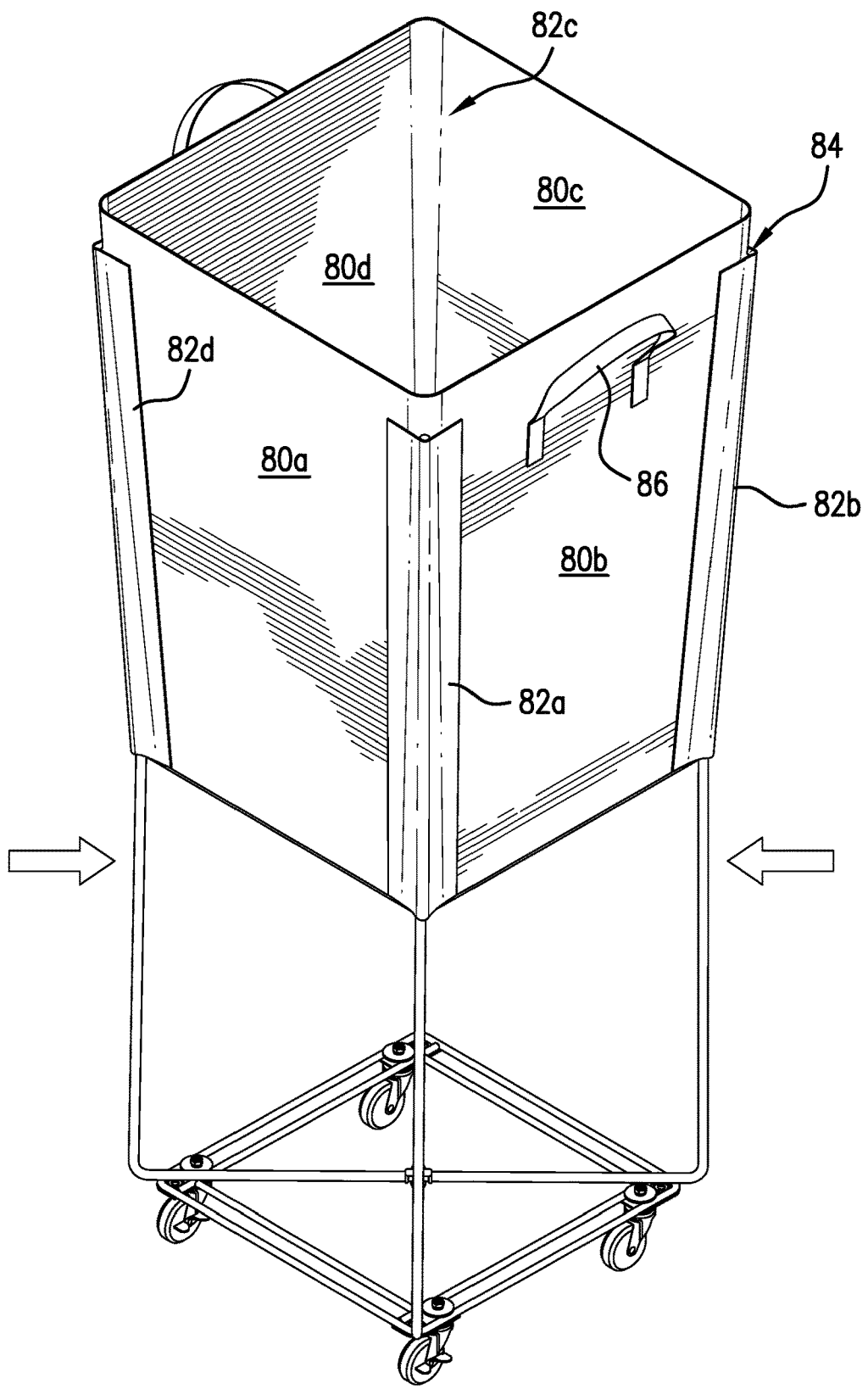
FIG. 5 illustrates how the fabric body is fitted on to the supporting frame assembly of the hamper of FIG. 1.

Once the supporting frame assembly 14 has been secured to the base frame 20, the fabric body 16 can be deployed. Referring to FIGS. 1B and 5, the fabric body 16 has four side walls 80a, 80b, 80c and 80d, and four vertical corner sleeve pockets 82a, 82b, 82c and 82d, each being secured (e.g., via stitching) to a separate corner of the fabric body 16. Each corner sleeve pocket 82a, 82b, 82c and 82d defines a vertical elongated channel 84 between the corner sleeve pocket 82a, 82b, 82c and 82d and the fabric body 16. A vertical bar 66 or 68 is adapted to be slid through each channel 84 so that the fabric body 16 is held and supported by the four vertical bars 66 and 68. A fabric base (not shown) can be provided at the bottom of the side walls 80a, 80b, 80c and 80d. Handles 86 can also be provided on one or more side walls 80a, 80b, 80c and 80d.

Figure 6A:
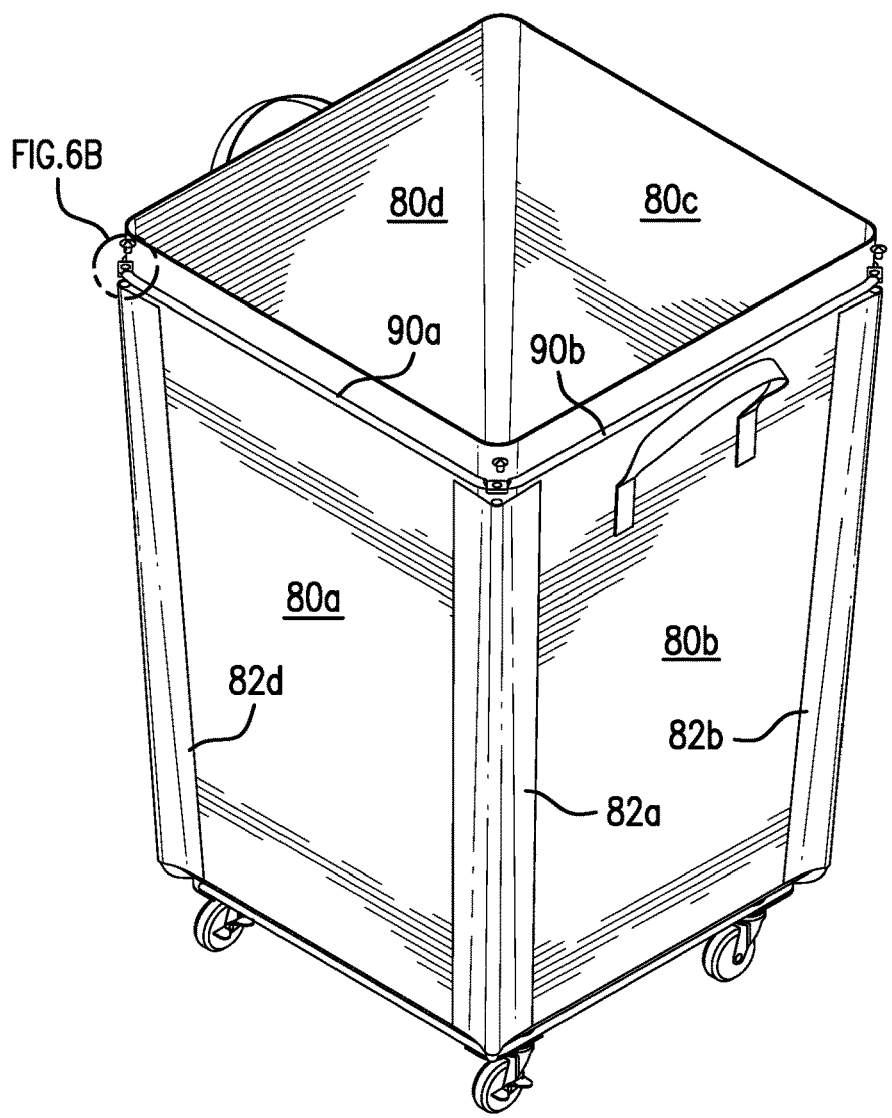
FIG. 6A illustrates how the top frame is secured to the supporting frame assembly of the hamper of FIG. 1.
Figure 6B:
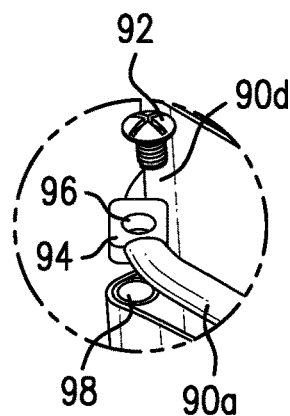
FIG. 6B is an enlarged view of the area marked Z in FIG. 6A.

Finally, referring to FIGS. 2, 6A and 6B, a top frame 18 is secured to the upper ends of the vertical bars 66 and 68 of the two U-shaped frames 60 and 62. The top frame 18 has four sides 90a, 90b, 90c and 90d, with a rounded corner region connecting the ends of adjacent sides 90a, 90b, 90c and 90d. Each corner region has a generally square or rectangular plate 94 with a hole 96. Each hole 96 is adapted to be aligned with the upper end of a corresponding vertical bar 66 or 68. The upper end of each vertical bar 66 and 68 has a threaded opening 98. A threaded screw 92 can then be inserted through each hole 96 to threadably engage each threaded opening 98. Once all four corner regions have been secured to the upper ends of the vertical bars 66 and 68, the hamper 10 is read for use.

All the frames and bars in the present invention can be provided in the form of a metallic material, such as aluminum, stainless steel, and iron. The fabric body 16 can be provided in the form of a durable fabric material, such as a cotton polyester blend fabric. The corner sleeve pockets 82a, 82b, 82c and 82d can be provided in the same material as the fabric body 16.

As a result, the hamper 10 of the present invention has a large fabric body 16 which can be used to hold a large quantity of laundry, including bulky laundry such as towels and bedsheets. The caster assemblies 22 allow the hamper 10 to be wheeled around conveniently. In addition, the separate components of the hamper 10, which are shown in FIG. 2 as separate components, can be packaged into a thin-profile package or box that occupies minimal storage space that is important for minimizing cost and space for shipping, and for occupying minimal shelf space at retail outlets. Finally, the components of the hamper 10 can be quickly and easily assembled for use.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A hamper, comprising:
  a base having a base frame with a base shelf provided inside the base frame, and a plurality of caster assemblies secured to the base frame;
  a supporting frame assembly having two U-shaped frames, with each U-shaped frame having a horizontal base bar and two vertical bars extending from opposite ends of the base bar, each vertical bar having an upper end, and with each base bar having a center, and with the two U-shaped frames coupled to each other at the center of each base bar, and wherein the base bars are secured to the base;
  a fabric body having a plurality of side walls, and four vertical corner sleeve pockets, with each vertical corner sleeve pocket defining a channel, and wherein each channel receives one of the vertical bars from the U-shaped frames;
  a top frame secured to the upper ends of the vertical bars; and
  wherein each center of each base bar has a groove, and the grooves of the two base bars are seated inside each other.

2. The hamper of claim 1, wherein the fabric body has four side walls, with a corner defined between adjacent side walls, and wherein each vertical corner sleeve pocket is positioned along each corner of the fabric body.

3. The hamper of claim 1, wherein the top frame has four sides that define four corners, and wherein the top frame is secured to the upper ends of the vertical bars at the four corners of the top frame.

4. A hamper, comprising:
  a base having a base frame with a base shelf provided inside the base frame, and a plurality of caster assemblies secured to the base frame;
  a supporting frame assembly having two U-shaped frames, with each U-shaped frame having a horizontal base bar and two vertical bars extending from opposite ends of the base bar, each vertical bar having an upper end, and with each base bar having a center, and with the two U-shaped frames coupled to each other at the center of each base bar, and wherein the base bars are secured to the base;
  a fabric body having a plurality of side walls, and four vertical corner sleeve pockets, with each vertical corner sleeve pocket defining a channel, and wherein each channel receives one of the vertical bars from the U-shaped frames;
  a top frame secured to the upper ends of the vertical bars;
  wherein the base frame has four sides that define four corners, and wherein each base bar is secured to two diagonally opposing corners of the base frame; and
  wherein a corner plate is provided at each corner of the base frame, with a caster assembly secured to each corner plate, and with each base bar secured to two diagonally opposing corner plates of the base frame.

5. A method of assembling a hamper, comprising:
  providing a base having a base frame with a base shelf provided inside the base frame;

securing a plurality of caster assemblies to the base frame;

providing a supporting frame assembly having two U-shaped frames, with each U-shaped frame having a horizontal base bar and two vertical bars extending from opposite ends of the base bar, each vertical bar having an upper end, and with each base bar having a center, each base bar having a groove, and with the two U-shaped frames coupled to each other at the center of each base bar;

seating the grooves of the two base bars inside each other;

securing the base bars to the base;

providing a fabric body having a plurality of side walls, and four vertical corner sleeve pockets, with each vertical corner sleeve pocket defining a channel;

inserting one of the vertical bars of the U-shaped frames through each channel; and securing a top frame to the upper ends of the vertical bars.

6. The method of claim 5, wherein the base frame has four sides that define four corners, and further including securing each base bar to two diagonally opposing corners of the base frame.

7. The method of claim 6, wherein a corner plate is provided at each corner of the base frame, further including securing a caster assembly to each corner plate, and securing each base bar to two diagonally opposing corner plates of the base frame.

8. The method of claim 5, wherein the fabric body has four side walls, with a corner defined between adjacent side walls, and wherein each vertical corner sleeve pocket is positioned along each corner of the fabric body.

9. The method of claim 5, wherein the top frame has four sides that define four corners, and further including securing the top frame to the upper ends of the vertical bars at the four corners of the top frame.

* * * * *